United States Patent
Benson

(10) Patent No.: US 11,480,128 B2
(45) Date of Patent: Oct. 25, 2022

(54) SYSTEM AND METHOD FOR DETERMINING AND ADJUSTING FUEL INJECTION CONTROL PARAMETERS

(71) Applicant: Cummins Inc., Columbus, IN (US)

(72) Inventor: Donald J. Benson, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/169,725

(22) Filed: Feb. 8, 2021

(65) Prior Publication Data

US 2021/0164415 A1 Jun. 3, 2021

Related U.S. Application Data

(63) Continuation of application No. PCT/US2019/046661, filed on Aug. 15, 2019.

(60) Provisional application No. 62/720,351, filed on Aug. 21, 2018.

(51) Int. Cl.
| | |
|---|---|
| *F02D 41/40* | (2006.01) |
| *F02D 41/00* | (2006.01) |
| *F02D 41/24* | (2006.01) |
| *F02M 55/02* | (2006.01) |
| *F02M 65/00* | (2006.01) |

(52) U.S. Cl.
CPC ........... *F02D 41/40* (2013.01); *F02D 41/009* (2013.01); *F02D 41/2467* (2013.01); *F02M 55/025* (2013.01); *F02M 65/003* (2013.01); *F02D 2200/0602* (2013.01)

(58) Field of Classification Search
CPC .... F02D 41/40; F02D 41/009; F02D 41/2467; F02D 2200/0602; F02D 41/247; F02D 41/3827; F02D 33/003; F02M 55/025; F02M 65/003; F02M 65/00
See application file for complete search history.

(56) References Cited

U.S. PATENT DOCUMENTS

| | | |
|---|---|---|
| 4,667,634 A | 5/1987 | Matsummura et al. |
| 4,718,391 A | 1/1988 | Rembold |
| 6,085,142 A | 7/2000 | Di Leo et al. |
| 6,122,589 A | 9/2000 | Yamaguchi et al. |
| 6,401,703 B1 | 6/2002 | Mamiya et al. |
| 7,437,234 B2 | 10/2008 | Halleberg |
| 7,475,671 B1 | 1/2009 | Fattic et al. |
| 7,945,372 B2 | 5/2011 | Geveci et al. |
| 9,470,167 B2 | 10/2016 | Carey et al. |

(Continued)

OTHER PUBLICATIONS

Search Report and Written Opinion, PCT Appln. No. PCT/U2019/46661, 7 pgs, dated Nov. 13, 2019.

*Primary Examiner* — Phutthiwat Wongwian
*Assistant Examiner* — Susan E Scharpf
(74) *Attorney, Agent, or Firm* — Taft, Stettinius & Hollister LLP

(57) ABSTRACT

A method of controlling an engine system includes controlling a fuel injector to perform a zero-fueling injector operation during operation of the engine, the zero-fueling injector operation including a non-zero injector on-time resulting in zero fueling by the injector, determining an injection system pressure change associated with the zero-fueling injector operation, modifying at least one fuel injection control parameter in response to the injection system pressure change, and using the modified fuel injection control parameter to control injection of fuel by the fuel injector during operation of the engine.

26 Claims, 10 Drawing Sheets

(56) References Cited

U.S. PATENT DOCUMENTS

| | | |
|---|---|---|
| 9,551,631 B2 | 1/2017 | Carey et al. |
| 9,677,496 B2 | 6/2017 | Carey et al. |
| 9,856,840 B2 | 1/2018 | Puckett et al. |
| 9,903,306 B2 | 2/2018 | Carey et al. |
| 2004/0011325 A1* | 1/2004 | Benson ............... F02D 41/3809 123/299 |
| 2004/0168674 A1* | 9/2004 | Djordjevic .......... F02D 41/3818 123/456 |
| 2005/0028788 A1* | 2/2005 | Shafter .................. F02M 45/08 123/445 |
| 2007/0162215 A1 | 7/2007 | Dietl et al. |
| 2008/0041331 A1* | 2/2008 | Puckett ................... F02D 41/38 123/198 D |
| 2009/0164095 A1* | 6/2009 | Geveci .................. F02D 41/247 701/103 |
| 2013/0013174 A1 | 1/2013 | Nistler et al. |
| 2014/0224223 A1* | 8/2014 | Benson ............... F02D 41/3809 123/478 |
| 2015/0075484 A1* | 3/2015 | VanDerWege ..... F02M 63/0265 123/294 |
| 2015/0275816 A1* | 10/2015 | Pursifull ............... F02D 41/123 123/456 |
| 2016/0032849 A1* | 2/2016 | Touchette ........... F02D 19/0678 701/103 |
| 2018/0195458 A1* | 7/2018 | Puckett ............... F02D 41/3082 |

\* cited by examiner

SYSTEM AND METHOD FOR DETERMINING AND ADJUSTING FUEL INJECTION CONTROL PARAMETERS

CROSS-REFERENCE

This application is a continuation of PCT Application No. PCT/US19/46661 filed Aug. 15, 2019, which claims the benefit of and priority to U.S. Application Ser. No. 62/720,351 filed Aug. 21, 2018, the disclosures of which are hereby incorporated by reference.

BACKGROUND

The present application relates to apparatuses, methods, systems, and techniques for determining and adjusting fuel injection control parameters and controlling fuel injection during engine operation. Under some operating conditions, engines benefit from delivering very small quantity injection pulses in order to improve fuel economy, improve engine performance, reduce audible noise, and improve emission. It would be desirable to provide a robust technique to accurately and precisely determine or estimate and deliver very small injection pulses for each individual injector in an injection system, under any operating conditions, and throughout the lifetime of the engine system. In order to control fuel injection to such a degree of accuracy and precision, it is necessary to know the injector commanded on-time associated with an injection quantity at any operating pressure. A number of proposals have been made to determine or estimate these minimum parameters. But conventional approaches suffer from a number of drawbacks, limitations, shortcomings and undesirable results including, for example, the occurrence of injection at undesired times, parasitic drag on fuel economy, increased noise, vibration and harshness, and increases in undesirable emissions. There remains a substantial need for the unique apparatuses, methods, systems, and techniques disclosed herein.

DISCLOSURE OF ILLUSTRATIVE EMBODIMENTS

For the purposes of clearly, concisely and exactly describing illustrative embodiments of the present disclosure, the manner, and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created and that the invention includes and protects such alterations, modifications, and further applications of the exemplary embodiments as would occur to one skilled in the art.

SUMMARY OF THE DISCLOSURE

Exemplary embodiments include unique apparatus, methods, systems and techniques for determining and adjusting fuel injection control parameters and controlling fuel injection during engine operation. Further embodiments, forms, objects, features, advantages, aspects, and benefits shall become apparent from the following description and drawings.

DETAILED DESCRIPTION OF ILLUSTRATIVE EMBODIMENTS

Figure 1:
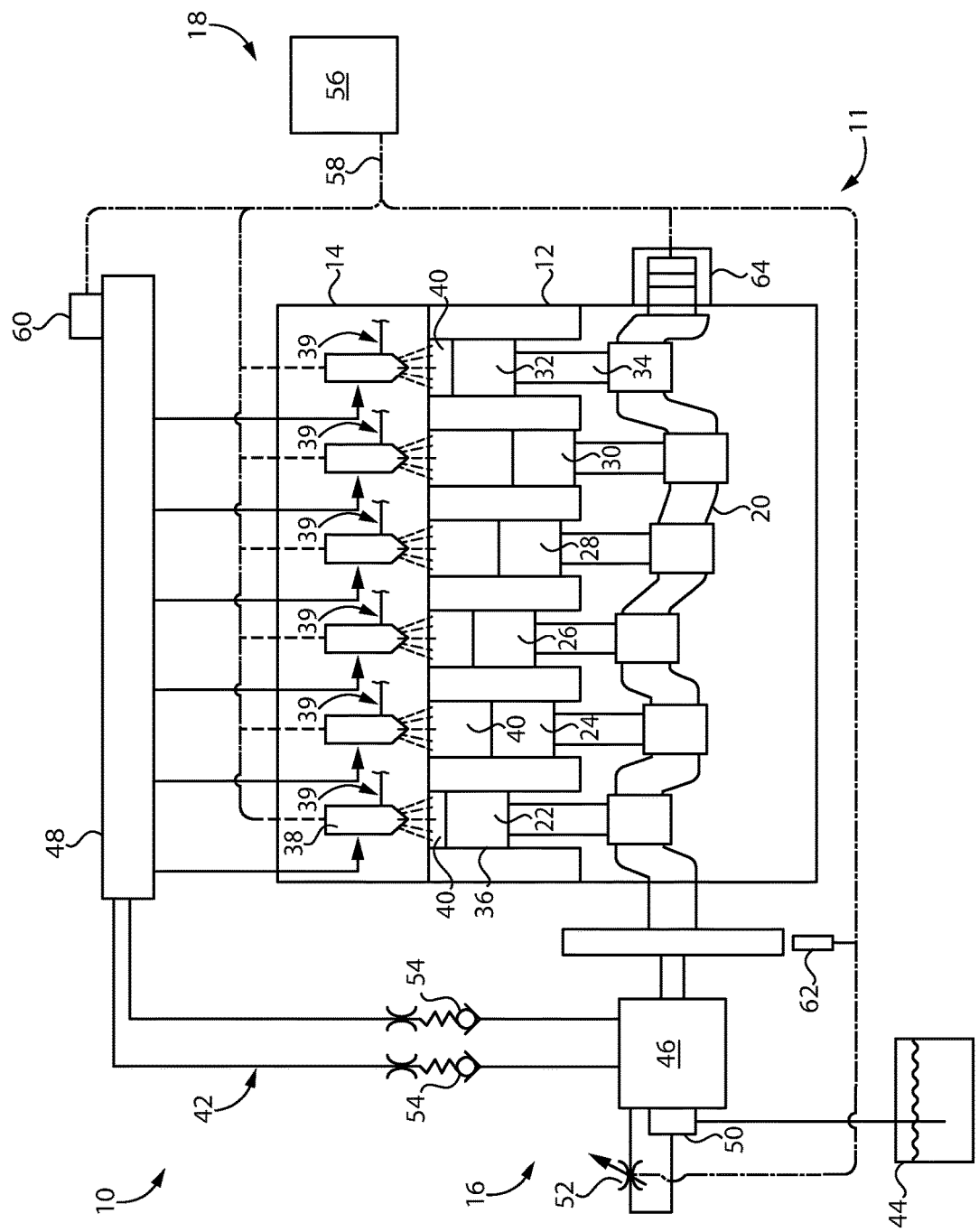
FIG. 1 is a schematic illustration of certain aspects of an exemplary engine system.

With reference to FIG. 1, there is illustrated a schematic depiction of certain aspects of an exemplary engine system including an internal combustion engine 10. In the illustrated embodiment engine 10 is a direct injection diesel engine. In other embodiments, the engine may be another type of engine which includes one or more fuel injectors, such as a dual-fuel engine, or other types of engines which include one or more fuel injectors. Engine 10 includes an engine body 11, which includes an engine block 12 and a cylinder head 14 attached to engine block 12, a fuel system 16, and a control system 18. Control system 18 receives operational inputs or signals from sensors located on engine 10 and transmits control signals to devices located on engine 10 to control the function of those devices, such as one or more fuel injectors.

Control system 18 can be configured to perform on-engine operations and processes which are performed during engine operation, such as the operations and processes described herein. Such on-engine operations and processes may be performed to adjust fuel injection control parameters. One example of a fuel injection control parameter is the maximum injector on-time which will produce zero fueling ($T_{zf}$) at a given injection system pressure. The value of $T_{zf}$ under a given set of operating conditions can serve as a foundational combustion control reference parameter from which injector-on times that provide a desired and commanded quantity of fuel injection corresponding to a desired and commanded engine torque output can be determined. Thus, for a given injection pressure, fuel injection timing commands which cause injectors associated with engine 10 to fuel the engine may be based upon or determined in response to the value of $T_{zf}$ under a given set of operating conditions.

Engine body 12 includes a crankshaft 20, a plurality of pistons 22, 24, 26, 28, 30, and 32, and a plurality of connecting rods 34. Pistons 22, 24, 26, 28, 30, and 32 are positioned for reciprocal movement in a plurality of engine cylinders 36, with one piston positioned in each engine cylinder 36. One connecting rod 34 connects each piston to crankshaft 20. As will be seen, the movement of the pistons under the action of a combustion process in engine 10 causes connecting rods 34 to move crankshaft 20. While engine 10 is shown having six cylinders, engine 10 may include any number of cylinders from a single cylinder to multiple cylinders. In the exemplary embodiment, engine 10 includes six cylinders arranged in an inline configuration. However, engine 10 may include any number of cylinders, such as one, two, four, six, twelve, etc., arranged in a variety of configurations, including inline, straight, flat, V and W configura- In an exemplary embodiment, a plurality of fuel injectors 38 is positioned within cylinder head 14. Each fuel injector 38 includes one or more injector orifices 66, shown schematically in FIG. 2, that fluidly connect a respective fuel injector 38 to a combustion chamber 40, each of which is formed by one piston, cylinder head 14, and the portion of engine cylinder 36 that extends between the piston and cylinder head 14.

Fuel system 16 provides fuel to injectors 38, which is then injected into combustion chambers 40 by the action of fuel injectors 38. Fuel injector 38 may include a nozzle valve or needle valve element (not shown) that moves from a closed position to an open position and then from the open position to the closed position, providing an injection event. The nozzle or needle valve element may move from the closed position to the open position when one or more of a solenoid, a piezoelectric actuator, or another actuator of fuel injector 38 is energized by control system 18 to inject fuel through the injector orifices 66 into combustion chamber 40 during an injection event. After fuel injector 38 is energized, a drain fuel flow may flow from fuel injector 38 into a drain fuel circuit portion 39, which returns the drain fuel flow to a location where the drain fuel may be used by engine 10, such as fuel tank 44. Because of the delay times between both the start energization of the injector's pilot valve and the start of the drain flow and the later start of injection as well as the delay times from the start of de-energization to the end of the drain flow and the end of injection, the drain flow will continue even after the injector is de-energized. The nozzle or needle valve element remains open for a time period, called the injection duration, that provides a predetermined volume, amount, or quantity of fuel to combustion chamber 40, as determined by control system 18 based on operation state inputs, such as acceleration and torque or power. At the end of the predetermined time period, control system 18 de-energizes fuel injector 38, which causes the nozzle or needle valve element to close, ending the injection event. While in this example, the nozzle or needle valve element is described as opening when energized and closing when de-energized, fuel injector 38 may also operate in an opposite manner where the nozzle or needle valve element opens when de-energized and closes when energized. Fuel injector 38 may be any of a variety of types of fuel injectors.

Fuel system 16 includes a fuel circuit 42, a fuel tank 44 containing a fuel, a high-pressure fuel pump 46 positioned along fuel circuit 42 downstream from fuel tank 44, and a fuel accumulator or rail 48 positioned along fuel circuit 42 downstream from high-pressure fuel pump 46. While fuel accumulator or rail 48 is shown as a single unit or element in the exemplary embodiment, accumulator 48 may be distributed over a plurality of elements that contain high-pressure fuel. These elements may include fuel injector(s) 38, high-pressure fuel pump 46, and any lines, passages, tubes, hoses and the like that connect high-pressure fuel to the plurality of elements, and a separate fuel accumulator 48 may thus be unnecessary. Fuel system 16 also includes an inlet metering valve 52 positioned along fuel circuit 42 upstream from high-pressure fuel pump 46 and one or more outlet check valves 54 positioned along fuel circuit 42 downstream from high-pressure fuel pump 46 to permit one-way fuel flow from high-pressure fuel pump 46 to fuel accumulator 48. Fuel circuit 42 connects fuel accumulator 48 to fuel injectors 38, which receive fuel from fuel circuit 42 and then provide controlled amounts of fuel to combustion chambers 40. Fuel system 16 may also include a low-pressure fuel pump 50 positioned along fuel circuit 42 between fuel tank 44 and high-pressure fuel pump 46. Low-pressure fuel pump 50 increases the fuel pressure to a first pressure level prior to fuel flowing into high-pressure fuel pump 46, which increases the efficiency of operation of high-pressure fuel pump 46.

Control system 18 may include a control module 56 and a wire harness 58. A number aspects of the disclosure are described in terms of sequences of actions to be performed by elements of a computer system, control system or other hardware capable of executing programmed instructions, for example, a general-purpose computer, special purpose computer, workstation, or other programmable data process apparatus. It will be recognized that in each of the embodiments, the various actions could be performed by specialized circuits (e.g., discrete logic gates interconnected to perform a specialized function), by program instructions (software), such as program modules, being executed by one or more processors (e.g., one or more microprocessors, a central processing unit (CPU), and/or application specific integrated circuit), or by a combination of both. For example, embodiments can be implemented in hardware, software, firmware, microcode, or any combination thereof. The instructions can be program code or code segments that perform necessary tasks and can be stored in a non-transitory machine-readable medium such as a storage medium or other storage(s). A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents.

The non-transitory machine-readable medium can additionally be considered to be embodied within any tangible form of computer-readable carrier, such as solid-state memory, magnetic disk, and optical disk containing an appropriate set of computer-executable instructions that cause a processor to carry out the techniques described herein. A computer-readable medium may include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (e.g., EPROM, EEPROM, or Flash memory), or any other tangible medium capable of storing information.

Control system 18 may also include an injection system pressure sensor 60 and a crank angle sensor. In the illustrated embodiment, injection system pressure sensor 60 is provided as an accumulator or rail pressure sensor. It shall be appreciated that injection system pressure sensor may any of a number of types of pressure sensing devices including, for example, pressure sensors configured to sense pressure at other fuel injector system locations and may comprise a variety of pressure sensing such as a diaphragm, a force transducer, a strain gauge, or other types of pressure sensing devices. The crank angle sensor may be a toothed wheel sensor 62, a rotary Hall sensor 64, or another type of device capable of measuring the rotational angle of crankshaft 20. Control system 18 uses signals received from accumulator pressure sensor 60 and the crank angle sensor to determine the combustion chamber receiving fuel, which may then be used to analyze the signals received from accumulator pressure sensor 60.

Control module 56 may be an electronic controller or control unit or electronic control module (ECM) that may monitor conditions of engine 10 or an associated vehicle in which engine 10 may be located. Control module 56 may be a single processor, a distributed processor, an electronic equivalent of a processor, or any combination of the aforementioned elements, as well as software, electronic storage, fixed lookup tables and the like. Control module 56 may include a digital or analog circuit. Control module 56 may connect to certain components of engine 10 by wire harness 58, though such connection may be by other means, including a wireless system. For example, control module 56 may connect to and provide control signals to inlet metering valve 52 and to fuel injectors 38.

When engine 10 is operating, combustion in combustion chambers 40 causes the movement of pistons 22, 24, 26, 28, 30, and 32. The movement of pistons 22, 24, 26, 28, 30, and 32 causes movement of connecting rods 34, which are drivingly connected to crankshaft 20, and movement of connecting rods 34 causes rotary movement of crankshaft 20. The angle of rotation of crankshaft 20 is measured by engine 10 to aid in timing of combustion events in engine 10 and for other purposes. The angle of rotation of crankshaft 20 may be measured in a plurality of locations, including a main crank pulley (not shown), an engine flywheel (not shown), an engine camshaft (not shown), or on the camshaft itself. Measurement of crankshaft 20 rotation angle may be made with toothed wheel sensor 62, rotary Hall sensor 64, and by other techniques. A signal representing the angle of rotation of crankshaft 20, also called the crank angle, is transmitted from toothed wheel sensor 62, rotary Hall sensor 64, or another device to control system 18.

Crankshaft 20 drives high-pressure fuel pump 46 and low-pressure fuel pump 50. The action of low-pressure fuel pump 50 pulls fuel from fuel tank 44 and moves the fuel along fuel circuit 42 toward inlet metering valve 52. From inlet metering valve 52, fuel flows downstream along fuel circuit 42 to high-pressure fuel pump 46. High-pressure fuel pump 46 moves the fuel downstream along fuel circuit 42 through outlet check valves 54 toward fuel accumulator or rail 48. Inlet metering valve 52 receives control signals from control system 18 and is operable to block fuel flow to high-pressure fuel pump 46. Inlet metering valve 52 may be a proportional valve or may be an on-off valve that is capable of being rapidly modulated between an open and a closed position to adjust the amount of fluid flowing through the valve.

Fuel pressure sensor 60 is connected with fuel accumulator 48 and is capable of detecting or measuring the fuel pressure in fuel accumulator 48. Fuel pressure sensor 60 sends signals indicative of the fuel pressure in fuel accumulator 48 to control system 18. Fuel accumulator 48 is connected to each fuel injector 38. Control system 18 generates and transmits or provides injection control signals to fuel injectors 38 that determine operating parameters for each fuel injector 38. Such injection control signals may include the length of time fuel injectors 38 operate or are actuated, also called the on-time. The commanded on-time to injector 38 is the length of time for which actuator portion 78 is energized. The duration of the opening of electrically actuated valve portion 74 is controlled by adjusting the commanded on-time. If the resulting duration of the opening of the valve portion 74 for the individual injector at the operating conditions is sufficiently long then the valve plunger (not shown) will respond by opening which will result in injection flow through the injector orifices 66 to combustion chamber 40. The injection control signals may also include the rate at which the nozzle valve element opens and closes, and timing of the opening and closing of the nozzle valve element with respect to the angle of crankshaft 20. Thus, the injection control signals control the amount of fuel delivered by each fuel injector 38 and the timing of fuel delivery with respect to a position of a piston in a respective cylinder 36.

Figure 2:
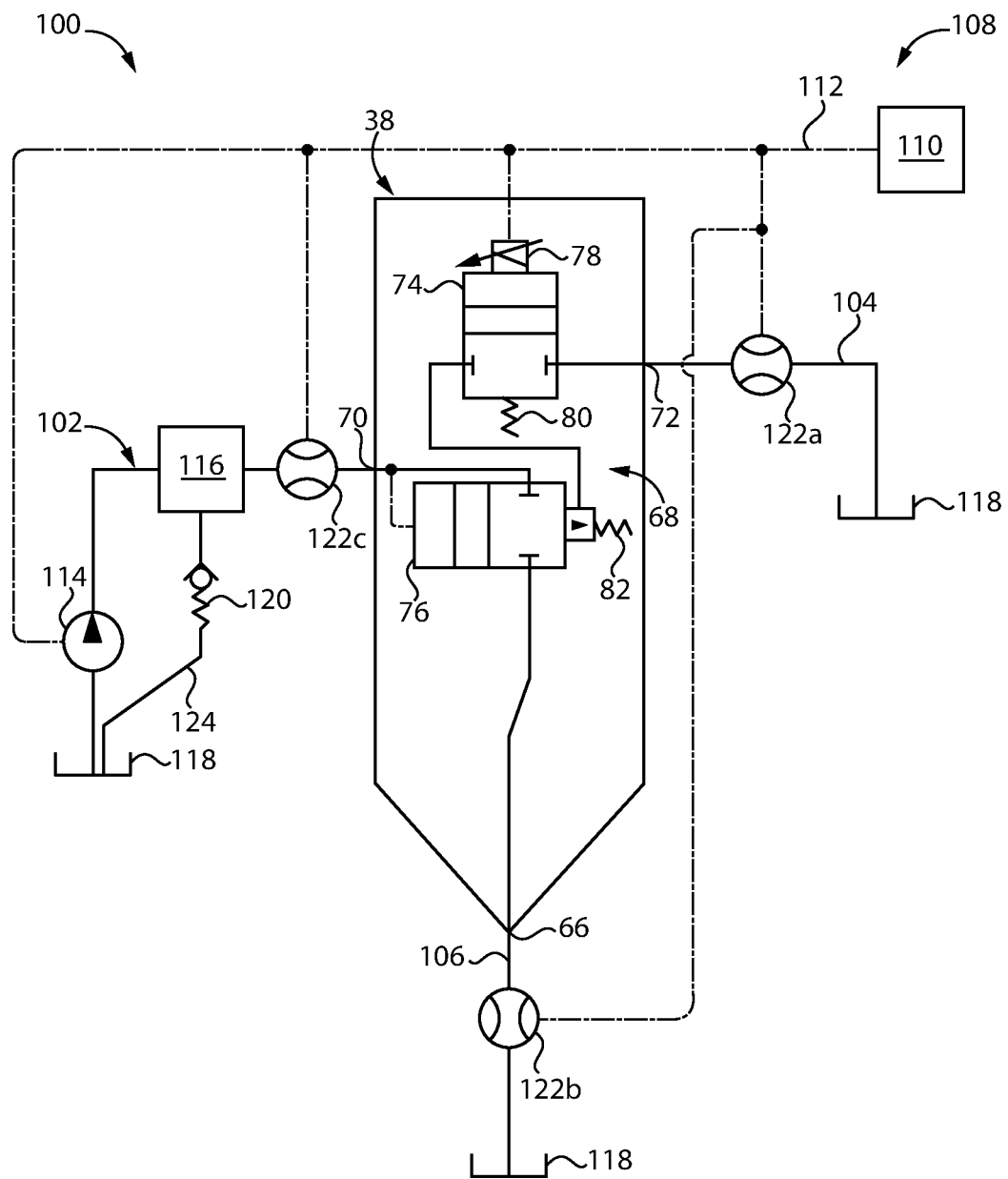
FIG. 2 is a schematic illustration of certain aspects of an exemplary off-engine fuel injector test system.

Referring to FIG. 2, in an exemplary embodiment fuel injector 38 includes a valve portion 68 for providing fuel by way of fuel injector orifice(s) 66 to combustion chambers 40. Fuel injector 38 also includes a fluid inlet 70, and a drain outlet 72. Valve portion 68 is positioned between fluid inlet 70 and injector orifice(s) 66, and between fluid inlet 70 and drain outlet 72. Valve portion 68 may include an electrically actuated valve portion 74 and a pilot actuated portion 76. Pilot actuated portion 76 of valve portion 68 is positioned between fluid inlet 70 and injector orifice(s) 66. Electrically actuated valve portion 74 is positioned between pilot actuated portion 76 and drain outlet 72. Electrically actuated valve portion 74 is connected to a control system, such as control system 18 or a test control system 108, and receives signals from the control system to cause electrically actuated valve portion 74 to operate.

Electrically actuated valve portion 74 includes an actuator portion 78 and a bias spring 80. Electrically actuated valve portion 74 may be in a variety of configurations, including normally open and normally closed, depending on the configuration of actuator portion 78. In the exemplary embodiment, electrically actuated valve portion 74 is normally closed, maintained by bias spring 80, which prevents fuel flow from pilot actuated portion 76 to drain outlet 72. Pilot actuated portion 76 includes a bias spring 82 that keeps pilot actuated portion 76 biased into a closed position. Actuator portion 78 may be a solenoid, a piezoelectric actuator, or another type of actuator.

Fuel injector 38 operates by receiving an injection control signal generated by the control system. The injection control signal is received by electrically actuated valve portion 74, causing actuator portion 78 to energize, moving a valve plunger (not shown) within electrically actuated valve portion 74 from the closed position shown in FIG. 2 to an open position, which permits a drain fluid to flow from pilot actuated valve portion 76 toward drain outlet 72. The drain fluid flows from a control chamber (not shown) in pilot actuated valve portion 76, which permits pilot actuated valve portion 76 to move from the closed position shown in FIG. 2 to an open position because of a net force against pilot actuated valve portion 76. With pilot actuated valve portion 76 in an open position, fuel is able to flow from fluid inlet 70 to injector orifice(s) 66. The configuration of fuel injector 38, and more particularly valve portion 68, is just one embodiment of many that are able to take advantage of the present disclosure. The principal criterion for any valve embodiment is that drain flow needs to have a definable and consistent relationship to the injected fuel quantity. As long as the relationship between drain flow and injected fuel quantity can be established for a valve portion, then the valve portion is compatible with the system and method of the present disclosure.

With continuing reference to FIG. 2, each fuel injector design or part number may be characterized in a test fixture shown as a simplified schematic and generally indicated at 100. Test fixture 100 may be used to predefine a fuel quantity relationship between the amount of fluid flowing through a drain of fuel injector 38 and the amount of fluid delivered through one or more injector orifice(s) 66. Once this relationship is defined for a particular fuel injector design, which may be associated with a part number, then dimensional and configuration controls may be established to define this relationship, which applies to future fuel injectors produced to the same design. Even though individual fuel injectors need not be tested once a design is qualified, a test fixture similar to test fixture 100 may obtain a limited number of data points for either a sample of fuel injectors or each fuel injector to ensure each fuel injector is operating in accordance with the predefined relationship. Thus, test fixture 100 provides a correlation or fuel quantity relationship between an amount or quantity of drain fuel flow and an amount or quantity of injected fuel flow for the defined fuel injector configuration for one or more operational states. Test fixture 100 includes appropriate mounting hardware (not shown) to secure each fuel injector 38 so that fluid and electrical connections to fuel injector 38 may be made. Test fixture 100 includes a fluid circuit 102, which further includes a drain fuel circuit portion 104 and an injection circuit portion 106. Test fixture 100 also includes a pump 114, an accumulator 116, a reservoir 118, a relief valve 120, and, in the exemplary embodiment, a plurality of flow meters 122.

Fluid circuit 102 extends from reservoir 118. Pump 114 is positioned along fluid circuit 102 downstream from reservoir 118. Pump 114 operates to draw fluid from reservoir 118 and to move fluid through fluid circuit 102. The fluid used in test fixture 100 may be a fuel such as diesel or may be another test fluid with a viscosity similar to fuel, such as a lubricant, complex hydrocarbon, coolant, or other fluid suitable for pumping under high pressure, e.g., greater than 1,000 bar. Accumulator 116 is positioned along fluid circuit 102 downstream from pump 114. A flow meter 122c may be positioned along fluid circuit 102 downstream from reservoir 116; however, flow meter 122c is preferably omitted as the flow quantity that it would measure may be determined as the sum of the flow through flow meters 122a and 122b. Fluid circuit 102 also includes a relief circuit portion 124 that connects accumulator 116 with reservoir 118. Relief valve 120 is positioned along relief circuit 124 between accumulator 116 and reservoir 118 and serves to limit the maximum pressure in the accumulator. The control system controls the pump delivery quantity to achieve and maintain the pressure in the accumulator. A flow meter 122a is positioned along drain fuel circuit 104, which connects to reservoir 118. A flow meter 122b is positioned along injection circuit portion 106.

Test fixture 100 also includes test control system 108. Test control system 108 may include a test control module 110 and a test wire harness 112. Test control system 108 may send control signals to pump 114 and to a fuel injector 38 being tested and may receive drain flow quantity flow signals from flow meter 122a and injection flow quantity signals from flow meter 122b.

In order to characterize a fuel injector 38, fuel injector 38 is positioned within test fixture 100. Fluid circuit 102 of test fixture 100 is connected to fluid inlet 70 of fuel injector 38. Drain fuel circuit portion 104 of test fixture 100 is connected to drain outlet 72 of fuel injector 38. Injection circuit portion 106 of test fixture 100 is connected to injector orifice(s) 66 of fuel injector 38. Test control system 108 is connected to actuator portion 78 by way of wire harness 112, which includes a suitable electrical connector for attaching to or interfacing with electric actuation portion 78, though such connection between test control system 108 and actuator portion 78 may be by other techniques, including a wireless transmitter and receiver arrangement. Once fuel injector 38 is connected as described hereinabove, an operator of test fixture 100 may now start a test process of fuel injector 38.

The test process consists of providing a signal from test control system 108 to energize actuator portion 78. When actuator portion 78 is energized, electrically actuated valve portion 74 opens, relieving fuel pressure from a control chamber (not shown) of pilot actuated valve portion 76 through drain fuel circuit portion 104, where the drain fluid flows into reservoir 118. As drain fluid flows through drain fuel circuit portion 104, the flow rate or volume of drain flow may be measured by flow meter 122a. Drain flow may be measured in other ways, such as by using mass meters, ultrasonic meters, or any other suitable method for measuring drain flow. The drain flow quantity may also be estimated using a simulation. The relief of pressure permits high-pressure fluid to move pilot actuated valve portion 76 to an open position. As pilot actuated valve portion 76 opens, fluid flows from fluid circuit 102 through pilot actuated valve portion 76 and then to injector orifice(s) 66. From injector orifice(s) 66, the fluid flows through flow meter 122b and into reservoir 118. To close pilot actuated valve portion 76, actuator portion 78 may be de-energized, which blocks drain flow from exiting fuel injector 38 through drain outlet 72. Pressure then builds in the control chamber (not shown), and a net force against pilot actuated valve portion 76 forces pilot actuated valve portion 76 to a closed position.

The drain flow signals from flow meters 122a and 122b are sent to test control system 108, which calculates the amount of fluid delivered through injector orifice(s) 66 in relationship to the amount of fluid that flows through drain fuel circuit portion 104. Test fixture 100 may use a variety of flow meter configurations. For example, there may be a different number and location of flow meters than shown in FIG. 2 to provide the necessary data to find the fuel quantity relationship between the amount or flow rate of drain fluid flow and the amount or flow rate of fuel flow through the injector orifice(s) 66 during an injection event. A suitable flow meter configuration enables calculation of fluid flow into drain fuel circuit 104 and fluid flow into injection circuit portion 106. Because it only requires two flow meters to perform the required calculations, the positions of the flow meters shown in FIG. 2 should be considered as possible locations for the flow meters.

Engine systems, such as the example illustrated in and described in connection with FIG. 1, and test systems, such as the example illustrated in and described in connection with FIG. 2, may be utilized in connection with a process which determines or estimates a pilot valve drain quantity ($Q_{pvzf}$) associated with the commanded injector on-time ($T_{zf}$) which corresponds to zero fueling injection quantity from the measured pressure drop data. The process may utilize a modeling methodology in determining or estimating $Q_{pvzf}$ and $T_{zf}$ that includes both off-engine calibration (performed in a test rig) and on-engine adaptation (performed during operation of the engine) of $Q_{pvzf}$ and $T_{zf}$.

The off-engine calibration operations may be performed in connection with a test system such as the example illustrated and described above in connection with FIG. 2. A first off-engine calibration operation can be used to define nominal coefficients values for nominal $T_{zf}$ and $Q_{pvzf}$ equations. For example, the nominal commanded injector on-time at which the injector begins to fuel ($T_{zf}$) and the nominal pilot valve drain flow associated with that on-time ($Q_{pvzf}$) may be determined in accordance with equations (1) and (2):

$$\frac{1}{T_{zf}} = C_{Tzf0} + C_{Tzf1} P + \frac{C_{Tzf2}}{P} \quad (1)$$

$$Q_{pvzf} = C_{Qpv\_nominal\_0} + C_{Qpv\_nominal\_1} * P + C_{Qpv\_nominal\_2} * P^2 \quad (2)$$

In equation (1) $C_{Tzf0}$ $C_{Tzf1}$, $C_{Tzf2}$ are the nominal coefficients which are determined from rig testing. These coefficients adapt on-engine for each injector based on estimated pilot valve drain quantity from pressure drop measurements and P is pressure. In equation (2) $C_{Qpv\_nominal\_0}$, $C_{Qpv\_nominal\_1}$, $C_{Qpv\_nominal\_2}$ are coefficients which are determined from rig testing and which, in certain forms, are not adapted during on-engine operation and P is pressure. For example, in equation 2 Qpvzf is Qpvzf_nominal. For the nominal injector CQpv_nominal_0, CQpv_nominal_1, and CQpv_nominal_2 are not adapted on-engine; however, there can be a relationship between $T_{zf}$ and P which adapts on-engine the value of Qpvzf as a function of Tzf and P for each injector.

A second off-engine calibration operation can be used to define the coefficients for the pilot valve drain flow only measurement target ($Q_{pv\ drain\ only}$) by subtracting out the quantity of fuel injected. A third off-engine calibration operation can then be used to define the coefficients/equation which define the pilot valve drain flow only quantity sensitivity to variation in injection system pressure and $T_{zf}$. A fourth off-engine calibration operation can be used to define the coefficients which define the sensitivity of changes in $Q_{pvzf}$ of an injector to changes in $T_{zf}$ of an injector.

The on-engine adaptation of the pilot valve drain quantity value $Q_{pvzf}$ and the zero fueling injection on-time $T_{zf}$ may be performed in connection with an operational engine system such as that illustrated and described above in connection with FIG. 1. For example, with reference to FIG. 3 there is illustrated a flow diagram depicting certain aspects of an exemplary process 200 which may be implemented in and performed by an electronic control system associated with an internal combustion engine powertrain such as control system 18. Process 200 is one example of a process which may be performed to estimate an individual injector's pilot valve drain quantity ($Q_{pvzf}$) associated with the commanded injector on-time which corresponds to zero fueling injection quantity ($T_{zf}$) from the measured pressure drop data. These values may be adapted from nominal starting values determined in off-line calibration for a type or class of injectors.

Process 200 utilizes inputs indicative of both measured or estimated operating conditions and system characteristics determined through off-engine calibration. For example, input 202 provides the current operating pressure for the injector being tested. In the case of common-rail systems, the rail pressure may be utilized as the current operating pressure for each injector that is tested. Other types of systems may utilize different measurements of current operating pressure, such as injector-specific measurements. Input 202 is provided to input 204, and to operations 211 and 214 all of which can vary in response to variation in the current operating pressure for an injector test. Input 204 provides the desired pilot valve drain flow margin at the operating pressure below that expected to produce a non-zero injection event to operations 211 and 214.

Process 200 includes a control loop 210 including operations 211-216 which may be executed in a repeating sequence during engine operation. Process 200 is preferably performed during events where no fueling is commanded for torque generation, such as when a vehicle is coasting or motoring downhill. However, process 200 if desired could take place at any time during the engine's operation since it results in no additional fuel being injected in the combustion chamber. For example, an injector can be commanded to produce a drain only pulse or pulses at any time during the engines operation and the resulting magnitude of the drain only pulse or pulses associated pressure drop can be obtained after accounting for pressure changes which resulted from all other sources. The operations of control loop 210 may be performed as a function of both the injector to be tested and the operating pressure to provide for adaptation injection control parameters particular to each injector in an injection over a board range of injection system operating pressures.

Operation 211 determines the commanded injector on-time at the current operating condition for the operating injector to produce the desired pilot valve drain only pulses quantity. In certain forms, operation 211 calculates the commanded injector on-time which is intended to produce a drain flow only injection event in accordance with equation (3):

$$T_{Drain\ Only\ Measurement\ Target} = T_{zf} - \frac{(Q_{pvzf} - Q_{Drain\ Only\ Measurement\ Target})}{(C_{dQ/dT0} + C_{dQ/dT1}P + C_{dQ/dT2}/T_{zf}^2)} \quad (3)$$

Figure 9:
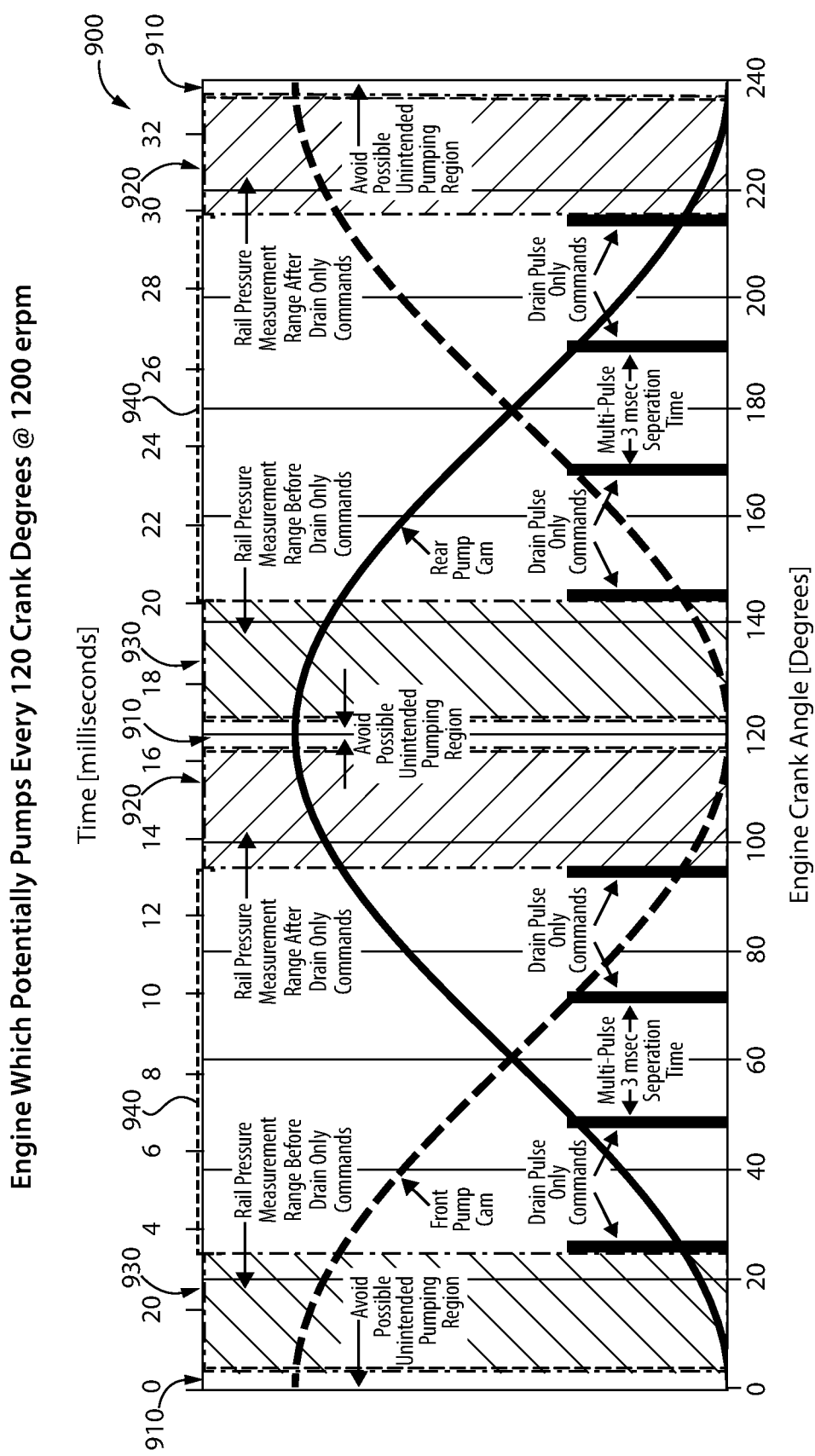
Figure 10:
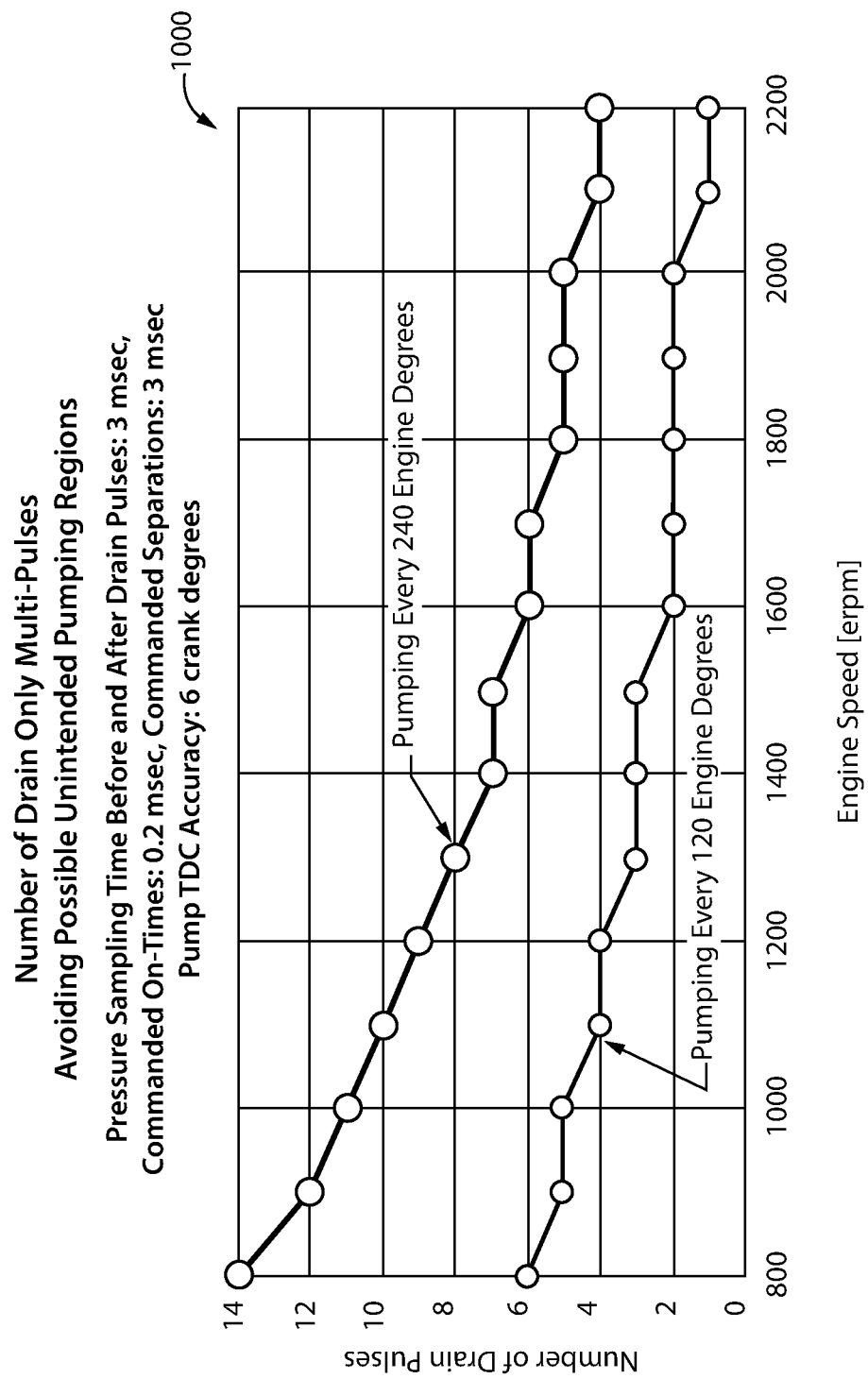

Operation 212 commands injection in accordance with the value determined for $T_{Drain\ Only\ Measurement\ Target}$. In certain forms, operation 212 may command this operation for a single pulse. In certain forms operation 212 may command this operation for multiple pilot valve drain only pulses to a test injector. Further details of the use of multiple pilot valve drain only pulses to a test injector are illustrated in and described in connection with FIGS. 9 and 10.

Operation 213 estimate the quantity of fuel per pulse which was removed from the high-pressure system using a method such as determining this quantity from the high-pressure system pressure drop.

Operation 214 estimates the commanded injector on-time $T_{zf}$ which would be at the threshold of producing an injection event at the operating test conditions for the test injector. In certain forms, operation 214 estimate $T_{zf}$ for the test in accordance with equation (4):

$$T_{zf} = T_{Commanded\ Drain\ Only\ Measurement\ Target} + \frac{(Q_{pvzf} - Q_{Drain\ Only\ Measurement\ Value})}{(C_{dQ/dT0} + C_{dQ/dT1}P + C_{dQ/dT2}/T_{zf}^2)} \quad (4)$$

Operation 215 updates the Tzf relationship for the test injector using the new Tzf value along with the prior Tzf relationship. In certain forms, operation 215 uses a Kalman Filter or similar adaptive process or technique to update the $T_{zf}$ coefficients for the injector in accordance with equation (5):

$$1/T_{zf} = C_{Tzf0} + C_{Tzf1}P + C_{Tzf2}/P \quad (5)$$

Operation 216 updates the relationship between the change in the drain quantity and the change in the commanded injector on-time for the test injector. In certain forms, operation 216 updates $Q_{pvzf}$ for the injector in accordance with equation (6):

$$\text{Update } Q_{pvzf(injector)} = Q_{pvzf(nominal)} + (\text{Table values as a function of Pressure})*(T_{zf(injector)} - T_{zf(nominal)}) \quad (6)$$

Figure 3:
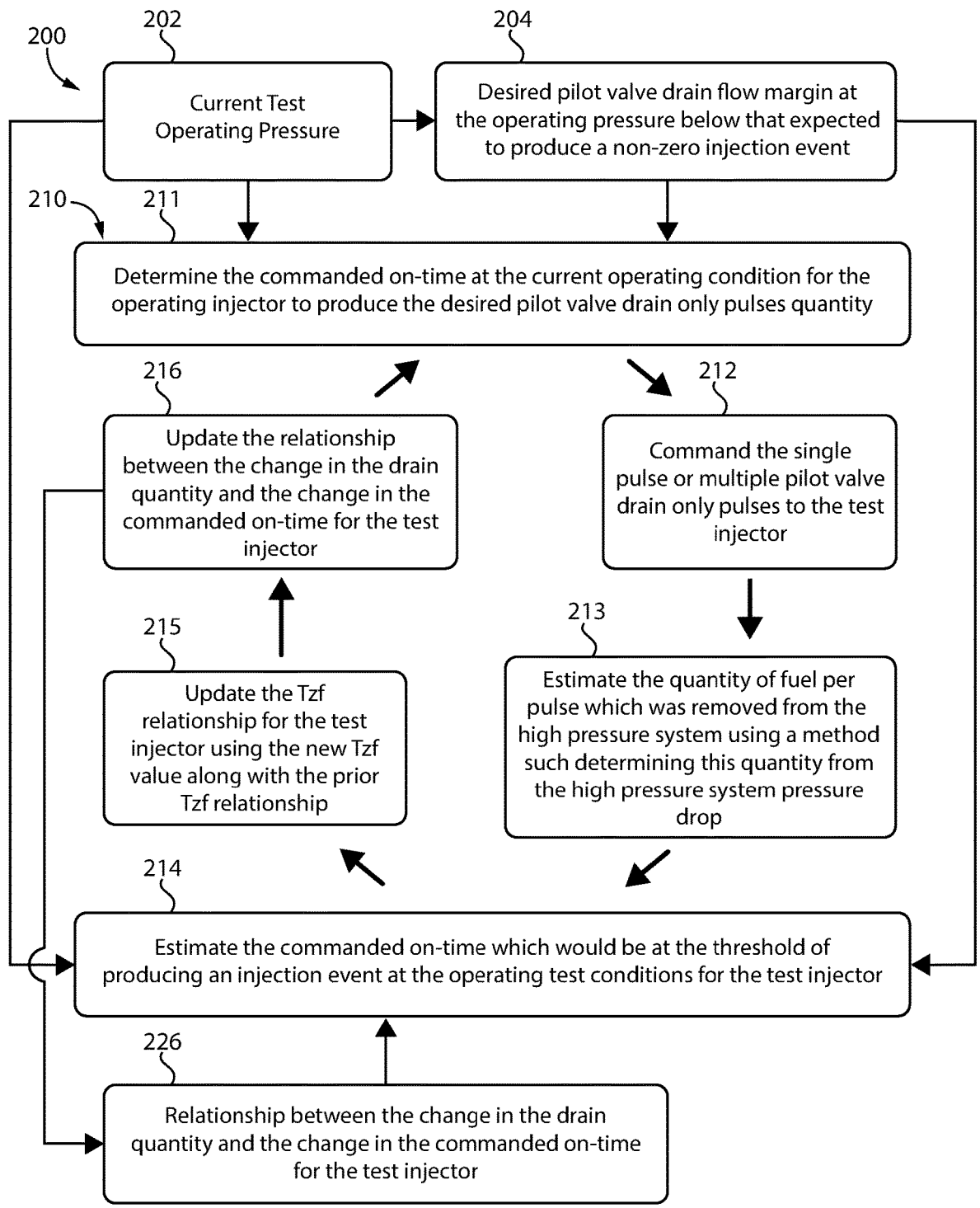
FIG. 3 is a flow diagram illustrating certain aspects of an exemplary fuel injection control process which may be performed in an engine system.

In addition to the operations described above, an additional operation not illustrated in FIG. 3 may be performed at engine production or after an injector change service events which initialize the coefficients which define $T_{zf}$ for each injector in accordance with equation (1). This initiation may utilize FON seeding based on end of life design definitions or empirical data.

Figure 4:
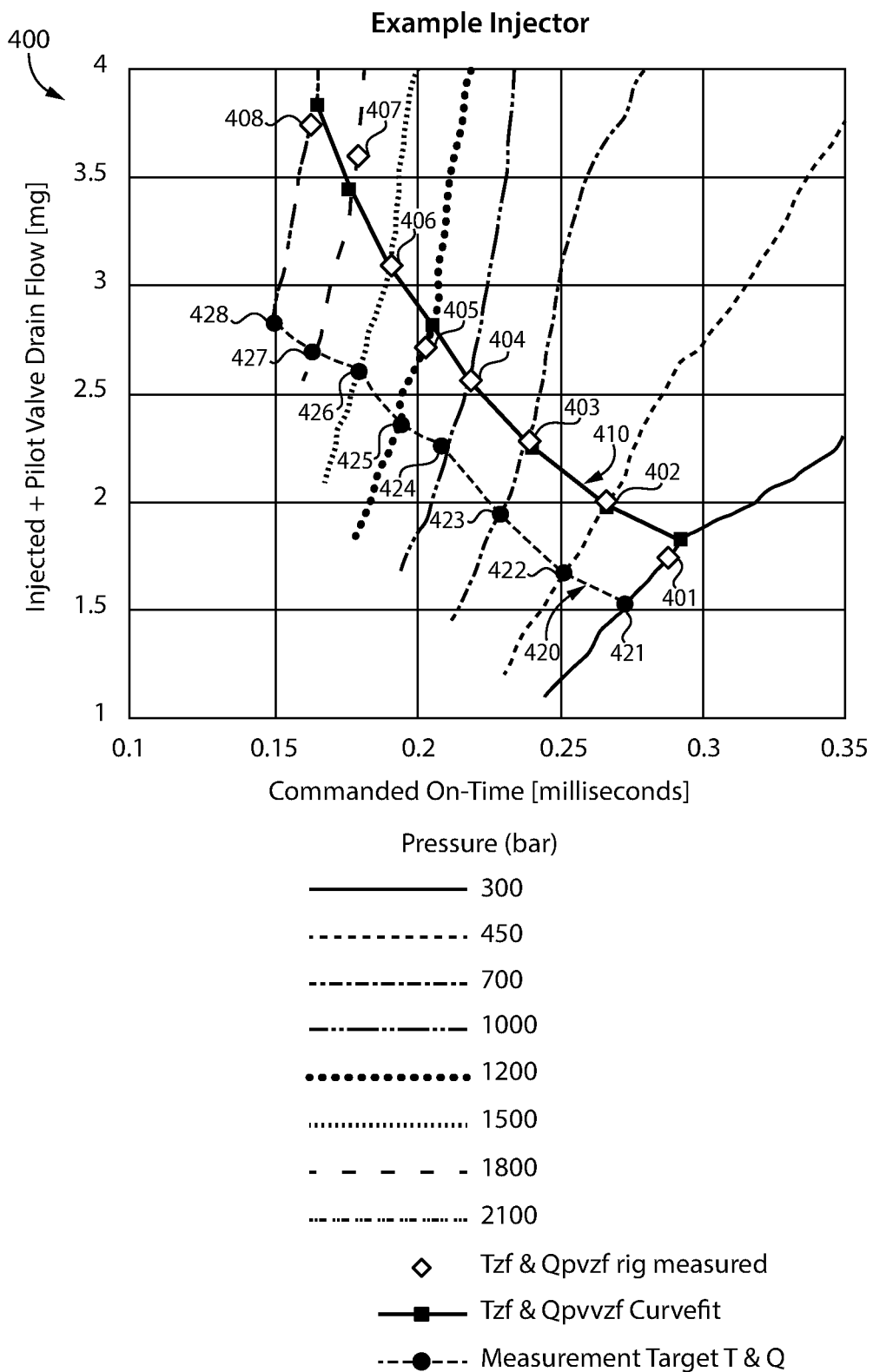
FIG. 4 is a block diagram illustrating certain aspects of an exemplary fuel injection controls which may be provided in an engine system.

With reference to FIG. 4, there is illustrated graph 400 depicting certain aspects of the above-described process and modeling methodology for determining or estimating $Q_{pvzf}$ and $T_{zf}$ which includes off-engine calibration and on-engine adaptation. In a first aspect, graph 400 illustrates test rig measurement values 401-408 for an example injector which measured values of $Q_{pvzf}$ at commanded values of $T_{zf}$ at different pressures (300, 450, 700, 1000, 1200, 1500, 1800 and 2100 bar, respectively). Test rig measurement values 401-408 may be provided non-adaptive, static values predetermined through off-engine calibration of a particular type of injector or class of injectors and are therefore reasonable starting estimates of how any particular injector of the given type or class will perform, although each particular injector is likely to vary from such nominal performance. Graph 400 further illustrates curve 410 which has been determined from measurements 401-408 by performing a curve fit operation in accordance with equation (1) such that curve 410 indicates commanded injector on-times which are intended to produce a drain flow only injection events.

In a second aspect, graph 400 illustrates on-line measurements 421-428 for the example injector which measured values of $Q_{pvzf}$ for commanded values of $T_{zf}$ at different pressures (300, 450, 700, 1000, 1200, 1500, 1800 and 2100 bar, respectively). The commanded on time values for measurements 421-428 can be determined by calculating a safety margin below curve 410. In certain forms, the non-injection drain quantity margin ($Q_{non\text{-}injection\ drain\ quantity\ margin}$) may be determined in accordance with equation (7) which is used to define a relationship between the change Qpvzf and the change in Tzf is shown in equation (7):

$$\frac{dQ_{Drain\ below\ T_{zf}}}{dT_{command}} = C_{dQ/dT0} + C_{dQ/dT1}P + C_{dQ/dT2}/T_{zf}^2 \quad (7)$$

Equation (7) can be used in conjunction with a $Q_{non\text{-}injection\ drain\ quantity\ margin}$ to calculate $T_{zf\ margin}$. $Q_{non\text{-}injection\ drain\ quantity\ margin}$ can either be set as a non-adaptive valve as a function of pressure or it can adapt during engine operation for each injector as a function of measurement variability.

In each on-line measurement 421-428, the valve commanded on-times including the $Q_{non\text{-}injection\ drain\ quantity\ margin}$ ($T_{zf\ margin}$) are commanded and the drain-only quantity ($Q_{Drain\ Only\ Measured\ Value}$) can be estimated from a measured pressure change (□P) since it has been reasonably assured that no injection will occur and the resulting pressure change therefore indicates a drain-only quantity. From the drain-only quantities ($Q_{Drain\ Only\ Measured\ Value}$), the coefficients characterizing injector performance can then be updated in accordance with equation (4) and the nominal test rig measurements values 401-408 can be updated and adapted based on the current actual operational performance of each individual injector. This technique allows substantially real-time adjustments of the commanded values of $T_{zf}$ which provide a zero-injection reference from which desired injection can be determined and injected.

Figure 5:
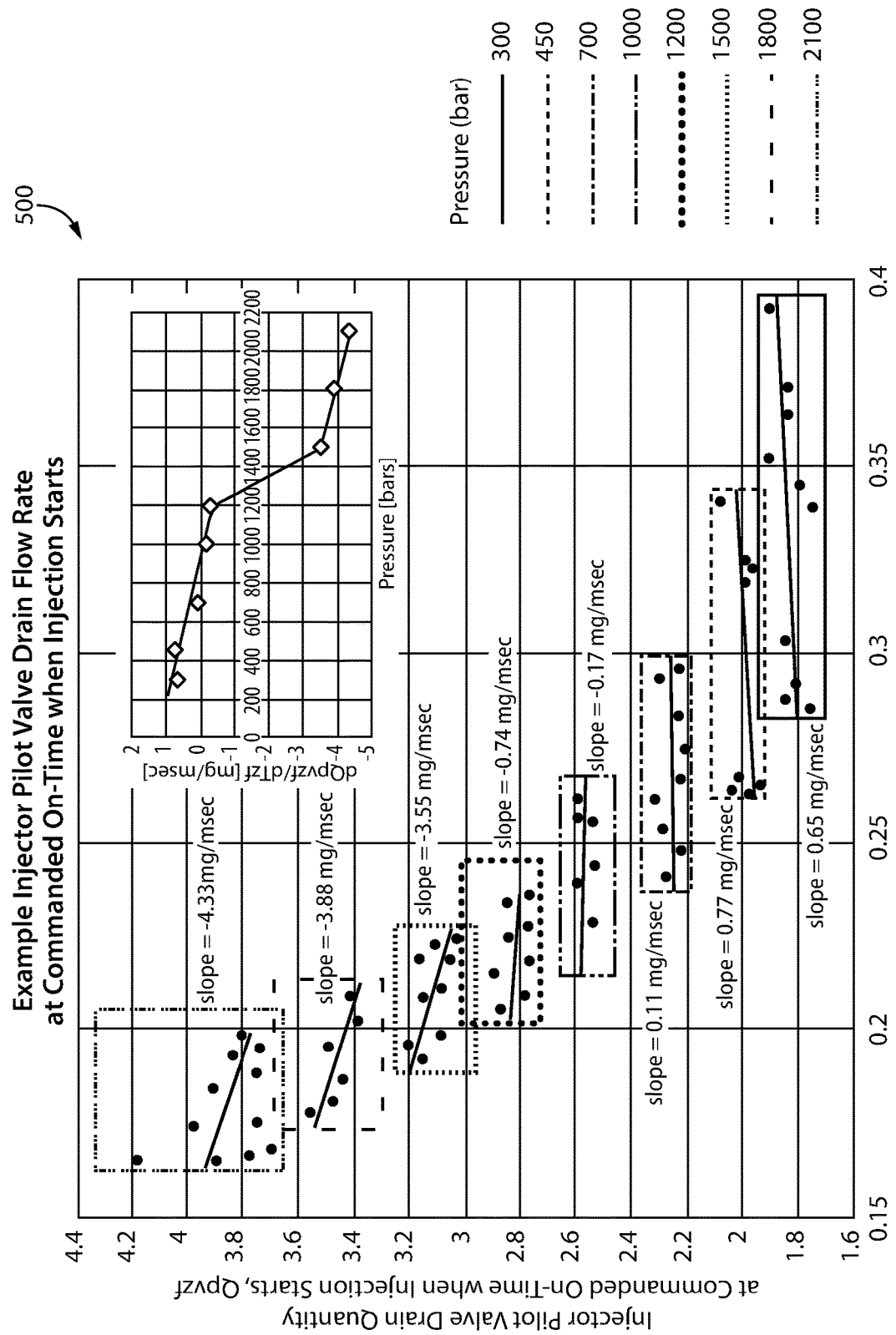
FIGS. 5-10 are graphs illustrating a number of exemplary measurement and determination principles and techniques which may be utilized in connection with fuel injection control processes such as the exemplary process of FIG. 3.

With reference to FIG. 5 there is illustrated a graph 500 depicting certain aspects of the adaption of $Q_{pvzf}$ as a function of $T_{zf}$ at different pressures. For some injector configurations, as the commanded on-time required to initiate injection ($T_{zf}$) increases, the injector's drain quantity ($Q_{pvzf}$) associated with that commanded on-time also increases. This trend in an increase in $Q_{pvzf}$ as $T_{zf}$ increases can be measured on an injector rig and input as a fixed relationship in the calibration model. In the illustrated example, the data indicates that at low pressures, Qpvzf tends to increase as Tzf increases. At high pressure, Qpvzf tends to decrease as $T_{zf}$ increases. Although the trend appears, there is significant variation in this Qpvzf to $T_{zf}$ relationship for individual injectors.

Figure 6:
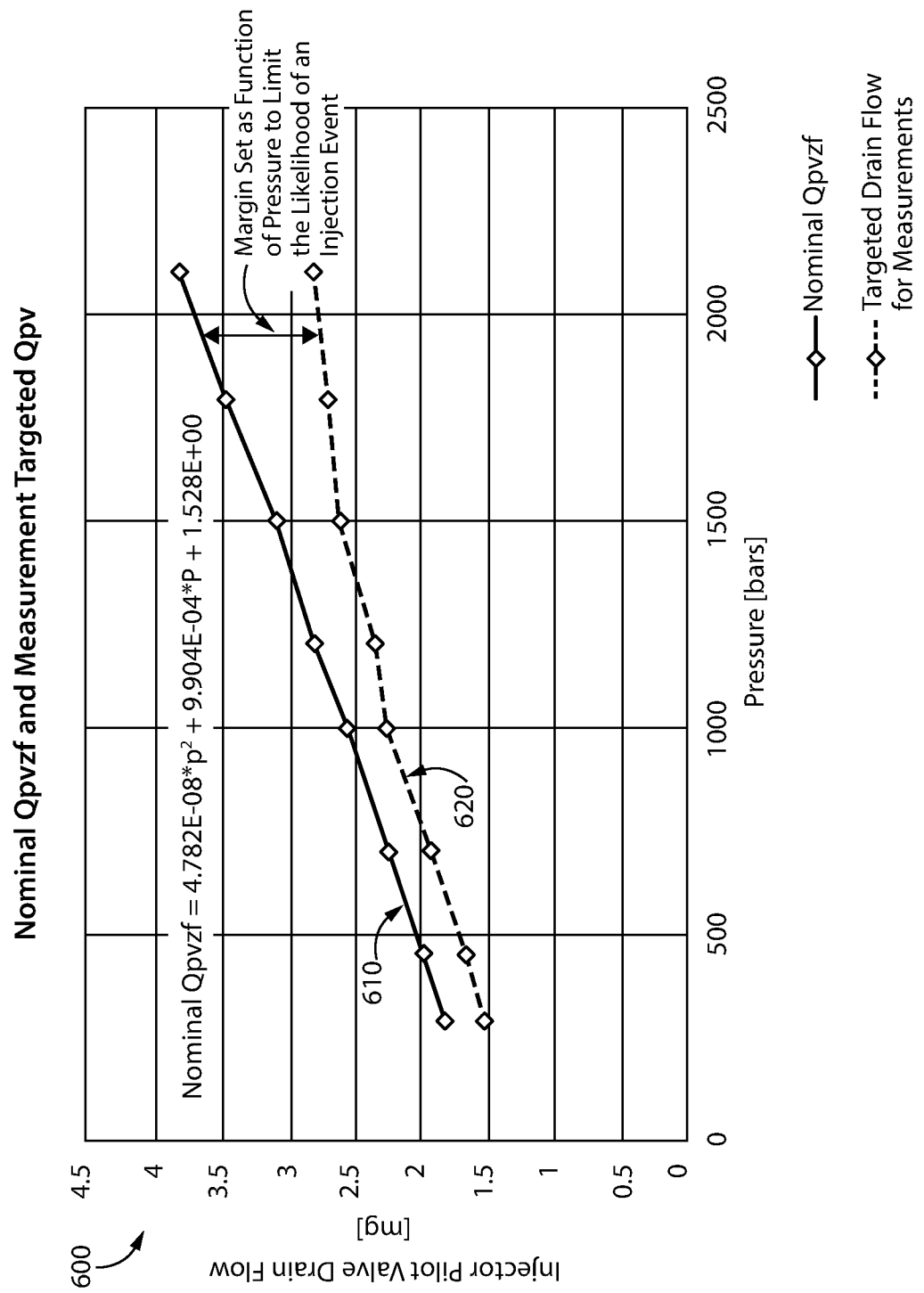

With reference to FIG. 6, there is illustrated a graph 600 depicting certain aspects of the determination of an on-engine targeted drain flow quantity which provides a margin $Q_{non\text{-}injection\ drain\ quantity\ margin}$ to limit the probability that an injection event will occur while also minimizing the error in extrapolation between measurement zero-injection values and non-zero-injection values. During on-engine injector operation, it is undesirable to produce unintended injection events. Accordingly, the margin $Q_{non\text{-}injection\ drain\ quantity\ margin}$ is established so that the injector's targeted drain flow only injection events are at sufficient drain flow quantities below $Q_{pvzf}$ to limit the likelihood of any injection. However, in order to also reduce the error in the drain flow quantity extrapolation, each injector's targeted drain flow is offset by a margin that not too far below $Q_{pvzf}$. Given that $Q_{pvzf} - Q_{Drain\ Only\ Measurement\ Target}$ equates to a fixed table as a function of pressure or an equation with coefficients which are determined from rig testing and do not adapt on-engine, the commanded on-time for the individual injector at the current system pressure may be determined in accordance with equation (3). An alternative method at establishing a real-time adaptive margin on-engine is to use the measured variation in the measurements to establish the margin. The smaller the variation in the measurements, the smaller the margin.

As illustrated in graph 600 the resulting margin ($Q_{non\text{-}injection\ drain\ quantity\ margin}$) is illustrated as the offset between nominal $Q_{pvzf}$ curve 610 and the targeted measurement $Q_{pvzf}$ curve 620 that provides targeted drain flow for on line measurement. As illustrated in graph 600, the magnitude of the offset between curves 610 and 620 varies with injection pressure. For example, because the illustrated example injector exhibits greater variance in when injection occurs at high pressure, as shown in FIG. 5, the offset is greater at higher pressure. Such variance over pressure is not necessarily limited to a higher pressure effect and is properly determined empirically for a given type or class of injectors as significant differences in this variance can be observed among these cohorts.

Figure 7:
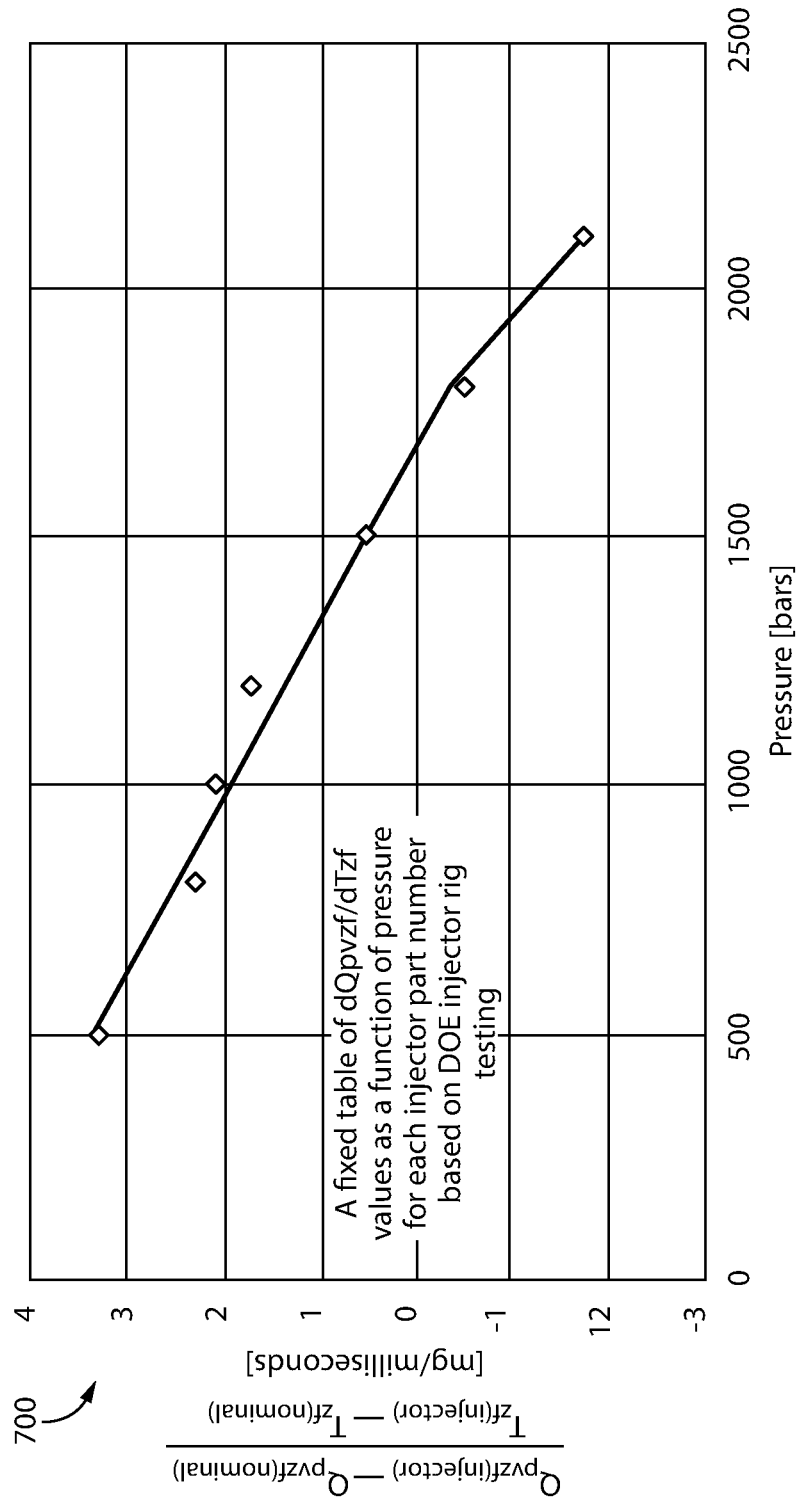

With reference to FIG. 7 there is illustrated a graph 700 depicting certain aspects of a procedure for adaption of $Q_{pvzf}$ as a function of $T_{zf}$. For some injector configurations, as the commanded on-time required to initiate injection [$T_{zf}$] increases, the injector's drain quantity [$Q_{pvzf}$] associated with that commanded on-time also increases. This trend in an increase in $Q_{pvzf}$ as $T_{zf}$ increases can be measured on an injector rig and input as a fixed relationship in the calibration model. In the illustrated example, the sensitivity of $Q_{pvzf}$ to $T_{zf}$ has the largest magnitude at low pressures. The relationship of $$\frac{Q_{pvzf(injector)} - Q_{pvzf(nominal)}}{T_{zf(injector)} - T_{zf(nominal)}}$$

can be predetermined in an off-engine calibration operation and provided in a non-adapting table or with non-adapting parameters which are a function of pressure for each injector configuration and are obtained based on rig testing.

Figure 8:
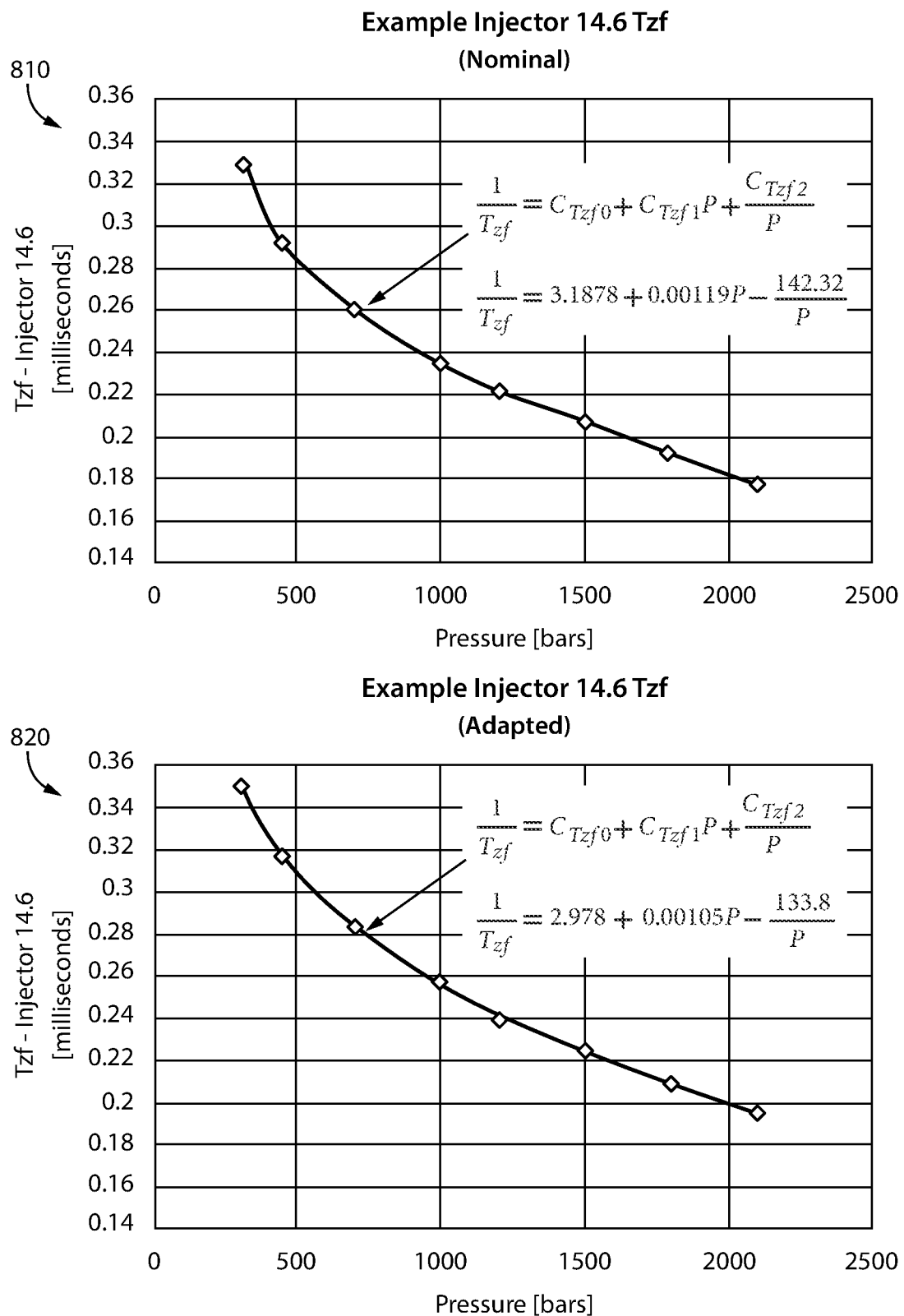

With reference to FIG. 8, there are illustrated graphs 810 and 820. Graph 810 depicts the results of nominal starting values for $T_{zf}$ coefficients of $C_{Tzf0}$ $C_{Tzf1}$ $C_{Tzf2}$ which were determined for a type or class of injectors using the above-described off-engine calibration operations. Graph 820 depicts the results of performing the above above-described on-engine adjustment operations to adapt the $T_{zf}$ coefficients of $C_{Tzf0}$ $C_{Tzf1}$ $C_{Tzf2}$ for an individual injector based on is current operational characteristics.

It shall be appreciated that form of the method used to represent the relationships between Tzf and Qpvzf as a function of pressure can take many forms based on the injector's configuration and operating characteristics and the methodology shown in equations (1) through (7) is just one of many possible embodiments. For example, other embodiments may model this relationship in accordance with equation (8):

$$Qpvzf = C0 + C1*P + C2/P + (\text{Table values as a function of Pressure})*Tzf \quad (8)$$

As illustrated above, the measurement of pressure drops during zero-fuel injection pulses provides a high degree of accuracy and precision. Such measurement can be further enhanced through several techniques. For example, the signal to noise ratio (SNR) of pressure drop measurements can be improved by determining a measured pressure value by averaging multiple injection pulses. This averaging tends to average out and reduce the noise inherent in each measurement leading to an improved SNR. On the other hand, measurements of multiple pulses present additional sources of error through the interaction between pulses that are performed too closely together. Sufficient spacing of pulses in a multi-pulse measurement can mitigate the impact of inter-pulse interaction. For one example injector, a pulse spacing of at least 2.5-3.0 milliseconds was determined to provide sufficient mitigation of inter-pulse interaction. The appropriate minimum pulse spacing may, of course, vary for different injection systems although the general principle of ensuring sufficient pulse spacing in multi-pulse measurements is applicable across a broad range of injector systems and scenarios. The particular spacing for a give injector type or class may be determined, for example, by performing two-pulse measurements at a variety of pulse spacing and observing the magnitude of the effect on the pressure measurement and estimate the magnitude of pilot valve drain fuel Qpvzf.

Another example technique which can be used to enhance accuracy and precision of pressure drop measurements during zero-fuel injection pulses can be realized by defining engine crank angle ranges most suitable for pulse measurement, whether single pulse or multi-pulse measurement. Injector fuel pumps are typically driven by one or more cam lobes whose rotation is determined by engine crank angle. For example, with reference to FIG. 9, there is illustrated a graph 900 depicting an example at an engine speed of 1200 rpm with a pump which pumps every 120 engine degrees.

In graph 900 pumping event regions 910 occur approximately every 120 degrees of engine crank angle. Pulse measurement in regions 910 should be avoided to avoid error introduced by pumping pressure. Pre-pulse regions 920 and post-pulse regions 930 provide appropriate opportunities to measure injection pressure before and after zero fueling pulse commands. Regions 940 define bands in which zero fueling pulse commands may be commanded while mitigating potential pumping error and allowing for pre-pulse and post-pulse pressure measurements. For the engine configuration and the operating condition shown, regions 940 each offer an opportunity for up to four appropriately spaced multi-pulse drain events to be commanded while still providing sufficient pre-pulse and post-pulse pressure measurement windows and staying out of unintended pumping regions.

The bandwidth of regions 940 and the corresponding number of opportunities for appropriately spaced injection pulses varies for different fuel pumps and also varies with engine speed. For example, with reference to FIG. 10, there is illustrated a graph 1000 depicting the potential number of injection pressure measurements (drain pulses) per engine revolution as a function of engine speed. As shown in graph 1000, the opportunity for multi-pulse measurements varies with the frequency of pumping events. Thus, pumping every 240 degrees provides an increased opportunity for multi-pulse measurements relative to pumping every 120 degrees. Graph 1000 also illustrates that multi-pulse measurements can be performed at most engine speeds, but tend to reduce with engine speed and may not be possible at engine speeds above a certain magnitude. This effect can be observed for both pumping every 120 degrees and pumping every 240 degrees.

It shall be appreciated that various aspects of the present disclosure may be implemented to provide a number of unanticipated benefits including, without limitation, the following exemplary aspects. In one aspect closed loop injected quantity fueling error may be minimized at all operating pressures in the zero and ultra-low fueling region. In another aspect, the intrusiveness of control measurements on engine operation may be minimized. In a further aspect, undesired injection quantities and frequency may be minimized. In an additional aspect, robustness of fuel injection controls may be maximized. It shall be appreciated that such minimization and maximization may include improvements constituting reductions or increases, respectively, or optimizations and are not necessarily limited to an absolute or theoretical minimization or maximization, although such results may be approached or realized in certain embodiments. A further aspect provides processed data which can be directly utilized by a variety of low fueling injector controls, which would occur to one of skill in the art, in order to minimize the closed loop ultra-low injected quantity fueling error at all operating pressures. Another aspect minimizes the intrusiveness on engine operation of injector measurement and injection control parameter adaption. For example, since no fuel is injected into the cylinder, no engine permission is required to conduct each measurement. In a further aspect, zero-injection pulses can be commanded at any timing relationship relative to the pump in order to minimize the probability that self-pumping events corrupt the data. In another aspect, pulses can be commanded at any timing relationship relative to the pump in order to more easily identify self-pumping events which would otherwise corrupt the data. In a further aspect, multiple pulses can be commanded in each measurement window to improve the signal to noise ratio. In another aspect, the accuracy and precision of the results can be approximately 0.0±0.4 mg of error in the adapted injection control parameters. In a further aspect, pulses can be commanded prior to the measurement pulses in order to raise the injector's drain pressure to its operational level. For injector configurations in which the injected quantity is affected by the injector's drain circuit pressure, commanding drain only pulses can effectively precondition the drain circuit to the desired pressure level prior to commanding subsequent on-times. For injectors that are sensitive to the drain circuit pressure, the magnitudes of the drain only pulses can be used to diagnose and correct to injector drain circuit performance issues. For example, drain circuits may include a check valve which is intended to act to maintain and regulate the drain circuit pressure. If the check valve leaks and fails to maintain the pressure, the drain circuit pressure would drop after injection events are terminated. If the relationship between the injectors drain only quantity and the drain circuit pressure is known for an injector configuration based on prior rig or engine testing, this information can be utilized real-time on-engine to characterize the operational performance of the drain circuit check valve and adapt to correct for its effect. In another aspect, data is obtained even when the injector's characteristics differ significantly from the nominal injector's characteristics. In a further aspect, the gain of the sum of the injector's pilot valve drain flow and injected quantity flow relative to the commanded on-time is lower at on-times less than Tzf than at on-time greater than Tzf which improves the measurement accuracy. In another aspect, parameters which are dependent on the injector configuration and which do not adapt during engine operation can be relatively easily calibrated from rig data. In a further aspect, the robustness of a system pressure drop algorithm is improved. Since any removal of fluid from the pressurized volume reduces the system pressure, the multi-pulse drain only pulse strategy detailed can be used to actively reduce the system pressure at any engine operating condition at which the current system pressure is greater than the current system pressure. This active pressure reduction strategy can be used to simplify systems through the elimination of a separate active pressure reduction valve. This multi-pulse drain only pulse strategy could also be employed at engine shut down to reduce the system pressure. In another aspect, for commanded on-times below on-times at which injection occurs, the drain quantity is independent of the cylinder pressure and differs from injection producing commanded on-times which can be affected by the cylinder pressure. Parallel algorithms can be used to assist in estimating injection quantity interaction with the cylinder pressure. In a further aspect, drain only pulses can be alternatively commanded on or off for an injector even when another injector is operating and the resulting delta can be used to estimate the critical on-time. It shall be further appreciated that the foregoing aspects may or may not be included in a given embodiment.

Aspects of certain example embodiments shall now be further described. A first example embodiment is a method of controlling an engine system, the method comprising: controlling a fuel injector to perform a zero-fueling injector operation during operation of the engine, the zero-fueling injector operation including a non-zero injector on-time resulting in zero fueling by the injector; determining an injection system pressure change associated with the zero-fueling injector operation; modifying at least one fuel injection control parameter in response to the injection system pressure change; and using the modified fuel injection control parameter to control injection of fuel by the fuel injector during operation of the engine.

In certain forms of the first example embodiment, the at least one injection system pressure change comprises a fuel rail pressure change. In certain forms, at least one fuel injection control parameter comprises a maximum injector on-time which will produce zero fueling at a given injection system pressure. In certain forms, a plurality of instances of the acts of controlling, determining, and modifying are performed separately for each of a plurality of fuel injectors. In certain forms, the acts of controlling, determining, and modifying are performed repeatedly during operation of the engine effective to adapt the at least one fuel injection control parameter to changes in the performance of the fuel injector. In certain forms, the act of controlling the fuel injector is repeated multiple times for each act of determining the at least one injection system pressure change. In certain forms, the act of determining the at least one injection system pressure change comprises: performing a first injection system pressure measurement after a first engine crank angle range defining a first fuel pumping event and before a second engine crank angle range in which the act of controlling the fuel injector is performed, and performing a second injection system pressure measurement after the second engine crank angle range and before a third engine crank angle range defining a second fuel pumping event. In certain forms, the act of modifying at least one fuel injection control parameter comprises modifying one or more coefficients of a model defining the maximum injector on-time. In certain forms, the model defining the maximum injector on-time includes at least a first coefficient of a first term which is independent of injection system pressure and a second coefficient of a second term which is dependent on injection system pressure. In certain forms, the engine system is operated to propel a vehicle. Certain forms of the first example embodiment include the features of any two or more of the foregoing forms.

A second example embodiment is a system comprising: an engine; a fuel injection system including a fuel injector; and an electronic control system configured to perform the acts of: controlling the fuel injector to perform a zero-fueling injector operation during operation of the engine, the zero-fueling injector operation including a non-zero injector on-time resulting in zero fueling by the injector; determining an injection system pressure change associated with the zero-fueling injector operation; modifying at least one fuel injection control parameter in response to the injection system pressure change; and using the modified fuel injection control parameter to control injection of fuel by the fuel injector during operation of the engine.

In certain forms of the second example embodiment, the at least one injection system pressure change comprises a fuel rail pressure change. In certain forms, the at least one fuel injection control parameter comprises a maximum injector on-time which will produce zero fueling at a given injection system pressure. In certain forms, the fuel injection system includes a plurality of injectors and the electronic control system is configured to perform the acts of controlling, determining, and modifying separately for each of the plurality of fuel injectors. In certain forms, the electronic control system is configured to perform acts of controlling, determining, and modifying repeatedly during operation of the engine effective to adapt the at least one fuel injection control parameter to changes in the performance of the fuel injector. In certain forms, the electronic control system is configured to perform the act of controlling the fuel injector multiple times for each act of determining the at least one injection system pressure change. In certain forms, the electronic control system is configured to perform the act of determining the at least one injection system pressure by: performing a first injection system pressure measurement after a first engine crank angle range defining a first fuel pumping event and before a second engine crank angle range in which the act of controlling the fuel injector is performed, and performing a second injection system pressure measurement after the second engine crank angle range and before a third engine crank angle range defining a second fuel pumping event. In certain forms, the electronic control system is configured to perform the act of modifying at least one fuel injection control parameter by modifying one or more coefficients of a model defining the maximum injector on-time. In certain forms, the model defining the maximum injector on-time includes at least a first coefficient of a first term which is independent of injection system pressure and a second coefficient of a second term which is dependent on injection system pressure. In certain forms, the engine system is configured as a prime mover of a vehicle. Certain forms of the second example embodiment include the features of any two or more of the foregoing forms.

A third example embodiment is an apparatus for controlling operation of an engine system including a fuel injection system including at least one fuel injector, the apparatus comprising a non-transitory controller-readable memory medium storing instructions executable by a controller to the acts of: commanding the fuel injector to perform a zero-fueling injector operation during operation of the engine, the zero-fueling injector operation including a non-zero injector on-time resulting in zero fueling by the injector; determining an injection system pressure change associated with the zero-fueling injector operation; modifying at least one fuel injection control parameter in response to the injection system pressure change; and using the modified fuel injection control parameter to control injection of fuel by the fuel injector during operation of the engine.

In certain forms of the third example embodiment, the at least one injection system pressure change comprises a fuel rail pressure change. In certain forms, the at least one fuel injection control parameter comprises a maximum injector on-time which will produce zero fueling at a given injection system pressure. In certain forms, the fuel injection system includes a plurality of injectors and the electronic control system is configured to perform the acts of commanding, determining, and modifying are performed separately for each of the plurality of fuel injectors. In certain forms, the electronic control system is configured to perform acts of commanding, determining, and modifying repeatedly during operation of the engine effective to adapt the at least one fuel injection control parameter to changes in the performance of the fuel injector. In certain forms, the electronic control system is configured to perform the act of commanding the fuel injector multiple times for each act of determining the at least one injection system pressure change. In certain forms, the electronic control system is configured to perform the act of determining the at least one injection system pressure by: performing a first injection system pressure measurement after a first engine crank angle range defining a first fuel pumping event and before a second engine crank angle range in which the act of commanding the fuel injector is performed, and performing a second injection system pressure measurement after the second engine crank angle range and before a third engine crank angle range defining a second fuel pumping event. In certain forms, the electronic control system is configured to perform the act of modifying at least one fuel injection control parameter by modifying one or more coefficients of a model defining the maximum injector on-time. In certain forms, the model defining the maximum injector on-time includes at least a first coefficient of a first term which is independent of injection system pressure and a second coefficient of a second term which is dependent on injection system pressure. Certain forms of the third example embodiment include the features of any two or more of the foregoing forms.

A fourth example embodiment is a method of adapting fuel injection to current on-engine injector operational characteristics, the method comprising: controlling an injector to perform one or more injection actuations resulting in zero engine fueling; monitoring one or more injection system pressure responses to the one or more injector operations; adapting one or more fuel injection control parameters in response to the one or more injection system pressure responses; and commanding drain only pulses in response to the one or more adapted fuel injection control parameters.

In certain forms of the fourth example embodiment, the act of adapting one or more fuel injection control parameters includes modifying one or more coefficients of a model defining a maximum injector on-time that will result in zero fueling.

In certain forms of the fourth example embodiment, the act of adapting one or more fuel injection control parameters includes modifying one or more coefficients of a model defining a maximum injector on-time that will result in zero fueling, wherein the model defining the maximum injector on-time includes at least a first coefficient of a first term which is independent of injection system pressure and a second coefficient of a second term which is dependent on injection system pressure.

In certain forms of the fourth example embodiment, the act of adapting one or more fuel injection control parameters includes modifying one or more coefficients of a model defining a maximum injector on-time that will result in zero fueling, wherein the model defining the maximum injector on-time includes at least a first coefficient of a first term which is independent of injection system pressure and a second coefficient of a second term which is dependent on injection system pressure, where the model is configured to update coefficients of the equation:

$$\frac{1}{T_{zf}} = C_{Tzf0} + C_{Tzf1}P + \frac{C_{Tzf2}}{P},$$

wherein $T_{zf}$ is the maximum injector on time, P is pressure, and $C_{Tzf0}$, $C_{Tzf1}$, $C_{Tzf2}$ are nominal starting coefficient values which are determined by off-engine testing.

In certain forms of the fourth example embodiment, the act of adapting one or more fuel injection control parameters includes modifying one or more coefficients of a model defining a pilot valve drain quantity associated with a maximum injector on-time that will result in zero fueling.

In certain forms of the fourth example embodiment, the act of adapting one or more fuel injection control parameters includes modifying one or more coefficients of a model defining a pilot valve drain quantity associated with a maximum injector on-time that will result in zero fueling, wherein the model is configured to update coefficients of the equation: $Q_{pvzf} = C_{Qpv\_nominal\_0} + C_{Qpv\_nominal\_1}*P + C_{Qpv\_nominal\_2}*P^2$, wherein $Q_{pvzf}$ is the pilot valve drain quantity associated with a maximum injector on-time that will result in zero fueling, P is pressure, and $C_{Qpv\_nominal\_0}$, $C_{Qpv\_nominal\_1}$, $C_{Qpv\_nominal\_2}$ are nominal starting coefficient values which are determined by off-engine testing.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method of controlling an engine system, the method comprising:
    actuating a fuel injector to perform a zero-fueling injector operation during operation of the engine, the zero-fueling injector operation including a non-zero injector on-time resulting in actuation of the injector but zero fueling by the injector;
    determining an injection system pressure drop attributable to the zero-fueling injector operation;
    modifying at least one fuel injection control parameter in response to the injection system pressure drop; and
    using the modified fuel injection control parameter to control injection of fuel by the fuel injector during operation of the engine.

2. The method of claim 1 wherein the injection system pressure drop comprises a fuel rail pressure drop.

3. The method of claim 1 wherein the at least one fuel injection control parameter comprises a maximum injector on-time which will produce zero fueling at a given injection system pressure.

4. The method of claim 1 wherein a plurality of instances of the acts of actuating, determining, and modifying are performed separately for each of a plurality of fuel injectors.

5. The method of claim 1 wherein the acts of actuating, determining, and modifying are performed repeatedly during operation of the engine effective to adapt the at least one fuel injection control parameter to changes in the performance of the fuel injector.

6. The method of claim 1 wherein the act of actuating the fuel injector is repeated multiple times for each act of determining the injection system pressure drop.

7. The method of claim 1 wherein the act of determining the injection system pressure drop comprises:
    performing a first injection system pressure measurement after a first engine crank angle range defining a first fuel pumping event and before a second engine crank angle range in which the act of actuating the fuel injector is performed, and
    performing a second injection system pressure measurement after the second engine crank angle range and before a third engine crank angle range defining a second fuel pumping event.

8. The method of claim 3 wherein the act of modifying at least one fuel injection control parameter comprises modifying one or more coefficients of a model defining the maximum injector on-time.

9. The method of claim 8 wherein the model defining the maximum injector on-time includes at least a first coefficient of a first term which is independent of injection system pressure and a second coefficient of a second term which is dependent on injection system pressure.

10. The method of claim 1 wherein the engine system is operated to propel a vehicle.

11. A system comprising:
    an engine;
    a fuel injection system including a fuel injector; and
    an electronic control system configured to perform the acts of:
        controlling the fuel injector to perform a zero-fueling injector actuation during operation of the engine, the zero-fueling injector actuation including a non-zero injector on-time resulting in zero fueling by the injector,
        determining an injection system pressure decrease occurring resulting from the zero-fueling injector actuation,
        modifying at least one fuel injection control parameter in response to the injection system pressure decrease, and
        using the modified fuel injection control parameter to control injection of fuel by the fuel injector during operation of the engine.

12. The system of claim 11 wherein the injection system pressure decrease comprises a fuel rail pressure change.

13. The system of claim 11 wherein the at least one fuel injection control parameter comprises a maximum injector on-time which will produce zero fueling at a given injection system pressure.

14. The system of claim 11 wherein the fuel injection system includes a plurality of injectors and the electronic control system is configured to perform the acts of controlling, determining, and modifying separately for each of the plurality of fuel injectors.

15. The system of claim 11 wherein the electronic control system is configured to perform acts of controlling, determining, and modifying repeatedly during operation of the engine effective to adapt the at least one fuel injection control parameter to changes in the performance of the fuel injector.

16. The system of claim 11 wherein the electronic control system is configured to perform the act of controlling the fuel injector multiple times for each act of determining the injection system pressure decrease.

17. The system of claim 11 wherein the electronic control system is configured to perform the act of determining the injection system pressure decrease by:
    performing a first injection system pressure measurement after a first engine crank angle range defining a first fuel pumping event and before a second engine crank angle range in which the act of controlling the fuel injector is performed, and
    performing a second injection system pressure measurement after the second engine crank angle range and before a third engine crank angle range defining a second fuel pumping event.

18. The system of claim 13 wherein the electronic control system is configured to perform the act of modifying at least one fuel injection control parameter by modifying one or more coefficients of a model defining the maximum injector on-time.

19. The system of claim 18 wherein the model defining the maximum injector on-time includes at least a first coefficient of a first term which is independent of injection system pressure and a second coefficient of a second term which is dependent on injection system pressure.

20. The system of claim 11 wherein the engine system is configured as a prime mover of a vehicle.

21. A method of adapting fuel injection to current on-engine injector operational characteristics, the method comprising:

controlling an injector to perform one or more injection actuations resulting in zero engine fueling;

monitoring one or more injection system pressure responses to the one or more injector operations, the one or more injection system pressure responses including a pressure drop;

adapting one or more fuel injection control parameters in response to the one or more injection system pressure responses; and commanding drain only pulses in response to the one or more adapted fuel injection control parameters.

22. The method of claim 21 wherein the act of adapting one or more fuel injection control parameters includes modifying one or more coefficients of a model defining a maximum injector on-time that will result in zero fueling.

23. The method of claim 22 wherein the model defining the maximum injector on-time includes at least a first coefficient of a first term which is independent of injection system pressure and a second coefficient of a second term which is dependent on injection system pressure.

24. The method of claim 23 where the model is configured to update coefficients of the equation:

$$\frac{1}{T_{zf}} = C_{Tzf0} + C_{Tzf1}P + \frac{C_{Tzf2}}{P},$$

wherein $T_{zf}$ is the maximum injector on time, P is pressure, and $C_{Tzf0}$, $C_{Tzf1}$, $C_{Tzf2}$ are nominal starting coefficient values which are determined by off-engine testing.

25. The method of claim 21 wherein the act of adapting one or more fuel injection control parameters includes modifying one or more coefficients of a model defining a pilot valve drain quantity associated with a maximum injector on-time that will result in zero fueling.

26. The method of claim 25 where the model is configured to update coefficients of the equation: $Q_{pvzf} = C_{Qpv\_nominal\_0} + C_{Qpv\_nominal\_1} * P + C_{Qpv\_nominal\_2} * P^2$, wherein $Q_{pvzf}$ is the pilot valve drain quantity associated with a maximum injector on-time that will result in zero fueling, P is pressure, and $C_{Qpv\_nominal\_0}$, $C_{Qpv\_nominal\_1}$, $C_{Qpv\_nominal\_2}$ are nominal starting coefficient values which are determined by off-engine testing.

\* \* \* \* \*